(12) United States Patent
Peng et al.

(10) Patent No.: US 11,922,136 B2
(45) Date of Patent: Mar. 5, 2024

(54) RESIDUE ARITHMETIC NANOPHOTONIC SYSTEM

(71) Applicant: The George Washington University, Washington, DC (US)

(72) Inventors: Jiaxin Peng, North Bethesda, MD (US); Tarek El-Ghazawi, Vienna, VA (US); Volker J. Sorger, Alexandria, VA (US); Shuai Sun, Arlington, VA (US)

(73) Assignee: The George Washington University, Washington, DC (US)

( * ) Notice: Subject to any disclaimer, the term of this patent is extended or adjusted under 35 U.S.C. 154(b) by 1332 days.

(21) Appl. No.: 16/284,762

(22) Filed: Feb. 25, 2019

(65) Prior Publication Data
US 2019/0265952 A1 Aug. 29, 2019

Related U.S. Application Data

(60) Provisional application No. 62/634,658, filed on Feb. 23, 2018.

(51) Int. Cl.
*G06F 7/72* (2006.01)
*G02B 6/122* (2006.01)
(Continued)

(52) U.S. Cl.
CPC ............ *G06F 7/729* (2013.01); *G02B 6/122* (2013.01); *G02B 6/3596* (2013.01); *G02F 1/311* (2021.01);
(Continued)

(58) Field of Classification Search
CPC ......... G06F 7/729; G06F 7/727; G02B 6/122; G02B 6/3596; G02B 2006/12109;
(Continued)

(56) References Cited

U.S. PATENT DOCUMENTS

| 4,838,646 A * | 6/1989 | Lasher ..................... G06E 1/04 |
| | | 359/107 |
| 4,910,699 A * | 3/1990 | Capps ..................... G06E 1/065 |
| | | 708/191 |

(Continued)

FOREIGN PATENT DOCUMENTS

| SU | 1476463 A * | 4/1989 |
| WO | WO-2022/040292 A1 | 2/2022 |

OTHER PUBLICATIONS

Bibliographic data for SU1476463, Startsev, 1987, downloaded Nov. 6, 2022 from https://worldwide.espacenet.com/publicationDetails/biblio?CC=SU&NR=1476463A1&K, 1 page. (Year: 1989).*

(Continued)

*Primary Examiner* — Daniel L Murphy
(74) *Attorney, Agent, or Firm* — Blank Rome LLP

(57) ABSTRACT

An integrated photonics computing system implements a residue number system (RNS) to achieve orders of magnitude improvements in computational speed per watt over the current state-of-the-art. RNS and nanophotonics have a natural affinity where most operations can be achieved as spatial routing using electrically controlled directional coupler switches, thereby giving rise to an innovative processing-in-network (PIN) paradigm. The system provides a path for attojoule-per-bit efficient and fast electro-optic switching devices, and uses them to develop optical compute engines based on residue arithmetic leading to multi-purpose nanophotonic computing.

13 Claims, 8 Drawing Sheets

(51) Int. Cl.
*G02B 6/35* (2006.01)
*G02F 1/313* (2006.01)
*G06E 3/00* (2006.01)
*G06E 1/06* (2006.01)
*G02F 1/31* (2006.01)

(52) U.S. Cl.
CPC .......... *G02F 1/3132* (2013.01); *G06E 1/065* (2013.01); *G06E 3/001* (2013.01); *G06F 7/727* (2013.01)

(58) Field of Classification Search
CPC ......... G02B 2006/12145; G02F 1/3132; G02F 1/311; G06E 3/001; G06E 1/065
USPC .......................................................... 708/490
See application file for complete search history.

(56) References Cited

U.S. PATENT DOCUMENTS

| | | | | |
|---|---|---|---|---|
| 5,425,039 A | * | 6/1995 | Hsu | ........................ H01S 3/067 372/99 |
| 7,020,372 B2 | * | 3/2006 | Lee | ........................ G02F 1/3556 257/E29.082 |
| 9,529,158 B2 | | 12/2016 | Sorger et al. | |
| 2018/0235692 A1 | | 8/2018 | Efimov et al. | |
| 2018/0246391 A1 | | 8/2018 | Sun et al. | |

OTHER PUBLICATIONS

Translation of Description of SU1476463, Startsev, 1987, , downloaded Nov. 6, 2022 from espacenet Nov. 6, 2022, 9 pages. (Year: 1989).*

A J. M. Lewis, et al., "His Bundle Pacing: A New Strategy for Physiological Ventricular Activation", Journal of the American Heart Association, Jan. 2022, 9 pgs.

M. Han, et al., "Catheter-Integrated Soft Multilayer Electronic Arrays for Multiplexed Sensing and Actuation During Cardiac Surgery", Nature Biomedical Engineering; vol. 4; Oct. 2020; pp. 997-1009.

K. Liu, et al., "Fundamental Scaling Laws in Nanophotonics", Scientific Reports, www.nature.com/scientificreports, dated Nov. 21, 2016, 12 pgs.

* cited by examiner

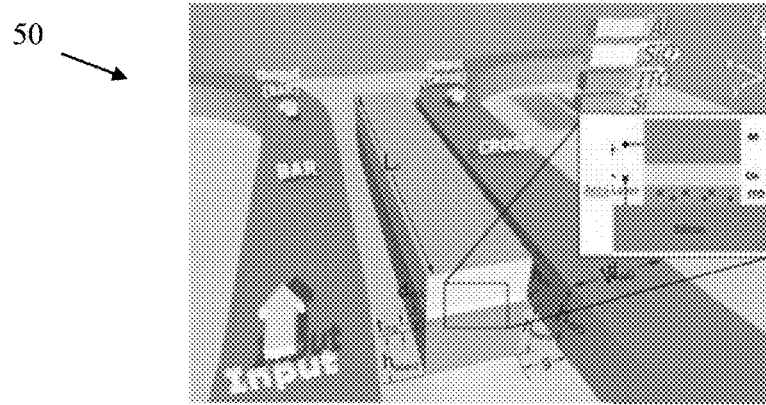
Figure 1 - PRIOR ART
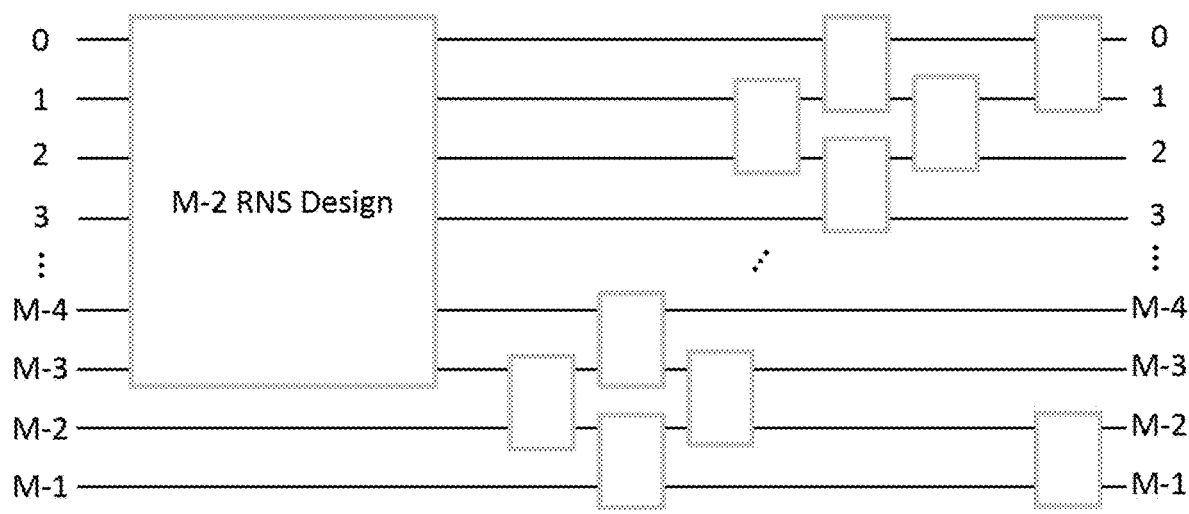
Figure 2

RESIDUE ARITHMETIC NANOPHOTONIC SYSTEM

RELATED APPLICATIONS

This application claims the benefit of U.S. Provisional Application No. 62/634,658, filed Feb. 23, 2018, the entire contents of which are incorporated herein by reference.

GOVERNMENT LICENSE RIGHTS

This invention was made with Government support under Grant/Contract No. FA9550-15-1-0447 awarded by Air Force Office of Scientific Research. The Government has certain rights in this invention.

BACKGROUND OF THE INVENTION

Field of the Invention

The present invention relates to integrated photonics computing system (from device to architectures) based on the residue number system (RNS).

BACKGROUND OF THE RELATED ART

Due to the end of Moore's law and Dennard scaling, feature reduction and higher speed of clocking are seizing to be the source for higher computer performance. Therefore, it is of paramount interest to explore alternative technologies and architectures for this post-Moore's law era of computing to maintain the US competitive edge and the U.S. Air Force superiority in all tasks that require computing. The annual R&D priorities memorandum issued by the administration in July of 2018 identifies strategic computing to be among the priorities for the U.S. national security.

SUMMARY OF THE INVENTION

The goal of the present invention is to develop an integrated photonics computing system (from device to architectures) based on the residue number system (RNS) to achieve orders of magnitude improvements in computational speed per watt over the current state-of-the-art. Residue arithmetic is of particular interest as it can represent a large number as a set of smaller numbers, which can be processed individually in parallel. Furthermore, RNS and nanophotonics have a natural affinity where most operations can be achieved as spatial routing using electrically controlled directional coupler ('switches'), thereby giving rise to an innovative processing-in-network (PIN) paradigm. The invention provides a path for attojoule-per-bit efficient and fast electro-optic switching devices, and uses them to develop optical compute engines based on residue arithmetic leading to multi-purpose nanophotonic computing.

The invention has a vertical approach that leverages its synergistic proven record in heterogeneous integrated photonics and light-matter-enhancement techniques with novel circuit and electro-optic hybrid, computer architecture and high-performance architectures for enabling synergistic device-to-architecture co-design. The resulting novel compute engines feature reduced complexity and processing-in-network (PIN) computing schemes, which minimizes overheads. Figures-of-merit (Speed/Energy-Footprint) estimates surpass electronic counterparts by orders-of-magnitude.

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 1 shows an example of a conventional 2×2 photonic switch that can be utilized with the invention;

FIG. 2 shows an illustrative non-limiting example of how the system scales to a modulo M (M is odd and larger than 3) system;

DETAILED DESCRIPTION OF THE INVENTION

Figure 3:
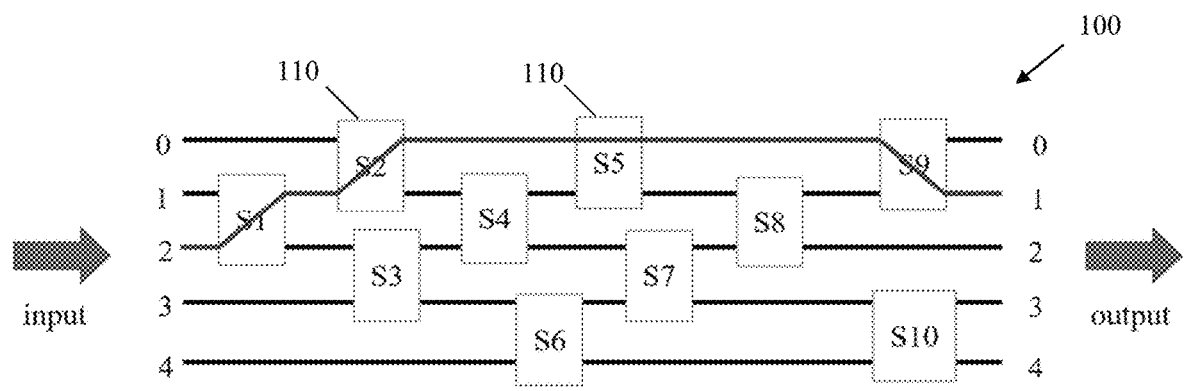
FIG. 3 is an example of the invention having a modulo-5 with 2×2 switches for addition.

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

Following the established technology roadmap for electronic devices for interconnected manycore chips, the power consumed due to communications as compared to computations continues to dramatically grow and the available bandwidth per compute operation will continue to drop. There are a variety of disruptive routes to enable transformational computing concepts; i) at the device and technology level, switching from electronics to optics, the bosonic character of photons can be used towards massively parallel data routing opportunities, ii) at the chip level a deviation from the memory-centric data-moving hungry standard von Neumann model is inevitable.

With classical integrated photonics (i.e. diffraction limited) being plagued by sizable footprints and power inefficiencies, optical logic appears to be disadvantaged to electronics. However, synergistic opportunities are present by intertwining computing and routing such that many operations can be executed without having to fetch and store lots of intermediate data, leading to new processing-in-network (PIN) concepts for developing post-Moore's law processors. That is, mapping mathematical arithmetic onto a network (here an optical network) of controllable optical switches enables a new class of multi-purpose computer that harvests the extreme parallelism and low power of integrated photonics. A key is to execute this vision at compact length scales, high speed, and attojoule per bit (aJ/bit) power budgets.

The invention utilizes a 2×2 switching device as a basic building block (for both processing and routing) in constructing a network of optical processors on the chip, thereby achieving unprecedented high operations/watt. The 2×2 switch is based on a voltage-controlled directional coupler engulfing the following key design insights: i) heterogeneous integration of unity-strong optical index modulating materials (i.e. ITO), ii) allowing for micrometer-compact and attojoule efficient switching, while iii) being utilizing Si photonics as a platform. The invention can utilize any suitable switching device, such as for example as shown in U.S. Pat. No. 9,529,158 and U.S. Published Patent Application No. 2018/0246391, the entire contents of which are hereby incorporated by reference. One such switching device 50 is shown, for example, in FIG. 1.

Using the nanophotonic switch into a crossbar fabric, processors can be built as extended residue arithmetic compute engines. This further enables intelligent crossbar architectures via interconnecting multiple residue processors. This allows performing many parallel computations using residue arithmetic and easy to leverage mathematical operations. For instance, collective operations such as reduction, as well as barrier synchronization as a part of its basic switching functionality, which allows for energy and buffering savings at the network level. We therefore provide such tight coupling of routing and computations to lead to a) high performance/cost functions, b) new paradigms of mapping an algorithm onto hardware, and c) novel computer designs deviating from von Neumann.

The integrated photonics switches are used as a basic building block to provide a general-purpose processor using residue-arithmetic complemented by other principles as necessary, and provide a chip-wide intelligent nanophotonic crossbar and various networks connecting all processors and enabling the mapping of some of the collective operations onto the cross bar. The invention can also include architectural level using FPGAs.

As such the present invention offers transformative insights by exploring transparent conductive oxides (TCO) for strong refractive index modulation via strong enhancements of light-matter-interactions. It also provides attojoule per bit efficient and GHz-fast optical switching devices. The compact 2×2 switches form basic building blocks for optical residue arithmetic functions. Devices are cascade-able and yield compute-performance related figure-of-merit=Latency/Energy-Footprint (GHz/fJ-cm2) that is significantly higher compared to electronic counterparts. Three SOI waveguides based mode-eliminating switch can have nanometer scale metal heaters as switching control by using self-aligned fabrication method. And high index tuning TCO (i.e. Indium Tin Oxide) can provide switch tuning.

The invention enables a novel approach to the design and evaluation of an entire class of optical compute engines based on residue arithmetic leading to multi-purpose computing. And it enables massively parallel and in-the-network computing designs, thus creating a path to deviate from the problematic von Neumann architecture. It also provides co-design principles that relate device technology to the switch, the network architecture and the routing algorithm and methodology. The invention can emulate and evaluate the performance and accuracy using well-accepted community benchmarks, and gain implementation insights with FPGA prototyping. The invention provides rapid and agile prototyping with enabling insights for advanced manufacturing on a silicon photonics platform. It also provides collective synergistic experiences of the PI's, who are well established in their fields, to explore innovative nanophotonic computing paradigms.

Atto-Joule Nanophotonics and Electro-Optic Switching
The Path to aJ/Bit: Enhancing Light-Matter-Interactions Mapping a mathematical operation or function onto hardware might radically change the way computers can be designed. With optics being superior over electronics with respect to communication, the ability to obtain a particular functionality in optics is however hindered by the weak interaction of light and matter. Thus, classical devices are bulky, slow and power hungry. The resulting 105 photons per bit of diffraction-limited optoelectronics (OE) are therefore unsustainably inefficient, and the large capacitance limits data speed and requires large wafer real estate. Considering only electrical constrains, OE devices improve with down-scaling. Here we provide micron and sub-micron long devices featuring deep diffraction limited modes that are able to result in 10-100's of atto-Farad small capacitances approaching pico-second RC-delay response. However, the optical constrains must also be considered; that is the optical 'speed' is given by the cavity photon lifetimes (rphoton ~ Q/λ, where λ=wavelength), rendering high quality (Q)-factor resonators a non-viable option when speed is relevant.

Secondly, the optical power efficiency is a rather complex function depending on the internal physics of each OE device, which can be quantified by the Purcell Factor defined as:

$$F\_p = 3/(4\pi^2)(\lambda_R/n)Q/V_{mode} \quad (1),$$

where Q is the cavity quality factor, $V_{mode}$ is the effective volume of electromagnetic energy of a resonant mode, and $\lambda_R$ is the resonant wavelength of the cavity, and n is the cavity material refractive index. With the aim to demonstrate and utilize a 2×2 electro-optic (EO) switch for a novel residue arithmetic computing engine, we performed a preliminary analysis on EO device scaling. Here we considered three different optical cavities. This expression takes the resistive energy loss of the modulator device itself into account during the charge-discharge cycles, ignores the power consumed by the driver circuit, and hence provides a lower bound for the switching energy. For field-effect devices the refractive index change is governed by an electric field E, where E=V/h, V is the driving voltage and h is the thickness of a device volume. It is further related to the bandwidth, BW, through $E > (\lambda_R \cdot BW)/(\pi r_{EO} n^2 c)$, $r_{EO}$ is the electro-optic coefficient of a material used. As an example of an EOM (energy efficiency and modulation speed) operating with the Pockels effect, Q factor is related to its bandwidth through $Q \approx 2\pi c/(\lambda_R \cdot BW)$. The electrical energy efficiency can thus be bounded by:

$$[\text{Energy}]_{Elec} > \tfrac{1}{2}\varepsilon_0 \varepsilon_r (2/(Q r_{EO} n^2))^2 \cdot \text{Volume} \quad (2).$$

The overall modulation bandwidth of an EOM is related to the photon lifetime and RC-limited bandwidth (i.e., fph and fRC) through this expression [LIU16], $$f_{3dB} = \frac{f_{ph} + f_{RC}}{\sqrt{f_{ph}^2 + f_{RC}^2}}, \quad (3)$$

where $f_{ph}=1/(2\pi\tau_{ph})$, $f_{RC}=1/(2\gamma(R_s+R_{dr})C_j)$. $R_s$ is the modulator series resistance, $R_{dr}$ is the driver impedance, and $C_j$ is the modulator junction capacitance, here $C_j = \varepsilon_0 \varepsilon_r$ (wl/h), where h is the thickness of a device volume, where $\varepsilon_0$ is the vacuum permittivity, $\varepsilon_r$ is the relative permittivity of the photonic material. Eqn. 3 indicates that the modulation bandwidth is limited by Q factor. For the comparison of electro-optic modulator (EOM) energy efficiency and modulation speed, we configure an EOM with cavity enhanced by ring resonator, Fabry-Perot cavity, and plasmonic particles cavity, respectively (FIG. 2) [LIU16]. As one can see it is possible to design (sub) micrometer short electro-optic switching and modulation devices operating at 10-100's of aJ/bit approaching ps timescales. Efficient 2×2 switching elements serve as building blocks for residue arithmetic in optical general-purpose computing.

Switchable Materials: Transparent Conductive Oxides (TCO)

A key design choice of EO active devices is the material whose refractive index is actively modulated. A promising modulation mechanism- and material combination is free carrier dispersive index-tuning in Indium-Tin-Oxide (ITO) or Aluminum Zinc Oxide (AZO).

Both belong to the family of transparent conducting oxides (TCO), which traditionally are deployed in the solar industry as low light absorbing electrical contacts. The ITO can alter its refractive index significantly upon charge accumulation in MOS-like structures in the near IR frequency range. Here we incorporate the ITO into Silicon photonic 2×2 switches and their respective permittivity tuning. Note, the resistive-well characteristics of ITO depends on both the oxygen concentration during deposition and tin doping activation (e.g. via temperature).

Nanophotonic 2×2 Switch Operating Principles

The elemental building block of the general-purpose computing engine based on residue arithmetic pursued in this effort is based on a nanoplasmonic 2×2 switching element, which relies on altering the refractive index of a nanometer thin TCO layer sandwiched in a hybrid-plasmon polariton mode. The device enables sub femto-Joule per bit and pico-second fast operation due to a small capacitance, and short cavity lifetime (Table 1). A design is the 3-waveguide directional coupler where an optical signal is switched from the input BAR waveguide (Silicon on insulator SOI) to either the CROSS output waveguide or is kept in the BAR. Switching is controlled via a voltage which alters the coupling of the TM1-3 supermodes. This actively alters the coupling length, Lc, to switch the signal to the CROSS port via $$L_c = \frac{\lambda}{(TM_1 + TM_3) - 2TM_2} = \frac{\lambda}{2\Delta n_{eff}}, \quad (4)$$

where $\Delta n_{eff}$ is the bias dependent index difference TM waveguide modes inside the island section of the device. The dramatic ITO index shift along with the strong light-matter-interaction of the plasmonic hybrid mode enable very efficient modulation of the supermode, and thus the single 2×2 switching element is <5 µm short resulting in 10-100's of aF capacitances and hence operations in the deep sub fJ/bit range. The extinction ratio (ER) and insertion loss (IL) are both measured as the power ratio between the two output states showing a higher performance for the CROSS state (Table 1).

The reason for the more lossy BAR state is that the ITO middle waveguide ('island') is biased to become quasi metallic making the island reflective. However, a small portion interacts with the island and suffers optical attenuation of about 2 dB per switch, and is about 1 dB for the CROSS state. This results in operations that can be as low as those listed in Table 1, which shows quantitative performance estimates for the compact plasmonic EO switch, where the device is operated at the wavelength of 1.55 m. The gate oxide thickness varies from 5 to 25 nm. The Energy per bit (E/bit) is calculated by E/bit=½ CV², where C is the device capacitance, V is the driving voltage, and ΔVbias=1-2 V for ITO, where ΔVbias is the bias associated with the change in driving voltage. Resistance 50-500Ω. The response time of the switch is expected to be rather fast mainly due to a low electrical capacitance, and low-quality factor cavities (i.e. no cavity deployed). While the mobility of ITO is usually low, this carrier-based switching effect is actually not limited by such mobility; the formation of the accumulation layer is equivalent to a time of flight and is sub ps, which is ⅓rd of the Fermi velocity. The device can be biased by a metallic via from the top to the plasmonic metal which performs double duty here.

TABLE 1

| Footprint | IL Insertion Loss dB | | ER Extinction Ratio dB | | E/bit Energy per bit | $t_{3dB}$ Response time |
|---|---|---|---|---|---|---|
| µm² | CROSS | BAR | CROSS | BAR | fJ | ps |
| 5-8 | 1.3 | 2.4 | 17.6 | 7.2 | 0.3-2 | ~1-10 |

A silicon-based device can be fabricated with similar design and the same switching concept of the switch 50. And instead of using the electro-optical index tuning of ITO, the middle island of the 3-waveguide silicon coupler can be thermally tuned by using a metal heater strip on top of it with oxide cladding sandwiched in between to avoid high loss plasmonic mode. To verify the design, measuring the light output from the two outer waveguides and the light intensity coming from the middle island, we can quantitatively evaluate the tunability of the metal heater. For example, if the light is injected from one side of the bus and been detected from the other side of the bus waveguides, then we could assume that this switch is still in the critical coupling state (the middle part of the three supermodes). On the other hand, if the light injected into the middle island only stays in the middle island, then that proves that the switch is at the mode-eliminating state, in which the middle waveguide is isolated from the system (the right part of the three supermodes).

Moreover, due to the complexity (over 4 critical variables and 5 more related variables all related to the tuning ability and the final performance) of this switch design, we implement an integrated script-based solver (a software module) with automatic performance evaluation system into Lumerical Mode and Interconnect software to increase our simulation speed and efficiency. With such automatic solver, we are able to map out the entire relationship between the effective index changes and the variables. As a result, this complete mapping is able to reveal all the connections between every two variables as a trade-off and help to enhance the switch performance at both the critical coupling state and the mode-eliminating state.

Instead of using the metal heater in the device 50, the two states (OFF and ON states) are achieved by varying the width of the middle waveguide and the corresponding gaps in between the outer waveguide. By injecting the light from either the outer waveguides or the middle waveguide, the light will be coupled into its adjacent waveguides in the critical coupling case. However, if it is in the mode-eliminating case, the light will only be propagated within the same waveguide without coupling since the center supermode is separated from the other two supermodes which support the light coupler between two outer waveguides. Based on our preliminary measurement results, the average loss of a 750 μm long switch is 34 dB (with 5 mW input power and 2.3 W output power). However, the averaged loss of a 750 μm long waveguide on the chip with the same fabrication process is 30 dB (with 5 mW input power and 5 W output power). Therefore, most of the loss in the measurement is due to the optical probe scattering and reflection, and the loss caused by the autoencoder (AE) structure is about 4 dB, which yields a 0.005 dB/μm propagation loss that matches with our simulation result.

To enable active tuning, a metal heater strip can be fabricated on top of the center waveguide after depositing a layer of oxide cladding. With the temperature-dependent refractive index of silicon, the switch can be turned into or out of the AE state by changing the refractive index of the middle silicon waveguide. The key of this thermal tuning design is to create enough temperature difference between the outer and the middle waveguides. Thus, we proposed a 3D heater-sink design that provides more heating pointing towards the middle waveguide while the sinks are put closer to the outer waveguide to absorb the heat propagates to the left and the right side. Based on the thermal simulation, the heat generated from the heater in the middle can create over 200K temperature difference and partially shift the switch from its original states. In addition, narrower heater width and closer heat sinks are two possible options to achieve a complete tuning. Also, higher melting temperature material (e.g. Tungsten) could also be used to replace gold to apply higher voltage and create higher temperature difference for better tuning. The small feature of the metal heater and heat sink gaps requires precise fabrication alignment, and therefore we developed a new self-aligned fabrication process which only requires one time alignment with high yield.

Due to the intrinsic low response speed of the thermal tuning, the three-waveguide switch with metal heater might only achieve kHz level switching speed. Other index tuning materials (e.g. ITO) could also be used to replace this thermal tuning design, to boost the switching speed to 10+ GHz. Transferring ITO on top of the middle switching island and sandwiching it between two thin oxide layers needs very precise alignment and deposition control. Moreover, all the electrical biasing circuit should be carefully designed using vertical interconnect access (via).

Processing In Network (PIN)

Next, we discuss how the photonic 2×2 switches 50 can be utilized to create functional networks such as crossbars. When combined with an algorithm such as residue arithmetic high figure-of-merit (FOM=(Latency×Energy Consumption×Footprint)−1) multi-purpose compute engines can be created (see Table 2 below). Here the biasing scheme of the 2×2 switch is important to improve the FOM; the device default CROSS state is for zero applied voltage (i.e. Vbias=0V). Thus, only for an applied bias the device draws power. Furthermore, the switch operates over a spectrum more than 200 nm wide (broadband). This allows for simultaneous wavelength usage towards massively parallel computing architectures such as explored here.

TABLE 2

| | | Building Block | | | | | | | |
|---|---|---|---|---|---|---|---|---|---|
| | | Electronic NoC (22 nm) | | | | Proposed RNS Array | | | |
| Performance | | Area (μm$^2$) | Energy (fJ/#) | Delay (ns) | FOM (GHz/fJ-cm$^2$) | Area (μm$^2$) | Energy (fJ/#) | Delay (ns) | FOM (GHz/fJ-cm$^2$) |
| Computation | Adder (16-bit binary, 40-bit RNS) | 181 | 171 | 1.5 | 2200 | 3 × 10$^4$ | 280 | 0.01 | 1200 |
| Communication | 4 × 4 Crossbar (16-bit binary, 40-bit RNS) | 199 | 400 | 1 | N.A. | 600 | 28 | 0.04 | N.A. |
| | 4-port router (16-bit binary) | 787 | 6920 | 3 | | included in RNS Design | | | |
| | Route + cros | 986 | 7320 | 4 | 3 | 600 | 28 | 0.04 | 148000 |

With the 2×2 switch as building blocks, it is possible to create structures for many computational primitives required for scientific computing. One of the primary approaches that we propose here is the use of residue arithmetic. A brief overview of the residue number system is given as follows; an integer number X is represented by its residue, or remainder, obtained by dividing X by a modulus M, representing as $r=|X|_M$. For instance, consider the number 96. The residue of N=96 using a modulus M=11 is 8, which could be represented as $|96|_{11}=8$. That is, when 96 is divided by 11, the remainder is 8 (i.e., 11 goes into 96 eight times (=88), with a reminder of 8 (i.e., 96-88)). Thus, the number 96 can be represented as the number 8, which is much simpler and reduces computational processing and storage requirements.

However, since the residue is always an integer from 0 to M−1, the representation is not unique. If multiple moduli are used, then a given number can be uniquely represented, as captured by the Chinese Remainder Theorem. In our case, we could use moduli $M_i$=11, 16, 19 to obtain a representation in the residue number system λ={8, 0, 1}. We represent it here as X={8, 0, 1}$_{[11,16,19]}$, using the subscript for the moduli. The only requirement is that the moduli $M_i$ should be relatively prime; in other words, every pair of moduli $M_i$ and $M_j$ (for i≠j) do not have any prime factors in common. The largest number that can be represented using this number system is equal to the product of the m moduli, $M_1 \times M_2 \times \ldots \times M_m$. In our example, it is 11×16×19=3344.

The use of residue number systems (RNS) potentially offers substantial improvements in performance and power consumption, by enabling carry-free arithmetic. As an example, consider the addition of X=96 and Y=205. Using the moduli from our previous example, these numbers can be represented as {8, 0, 1}$_{[11, 16, 19]}$ and {7, 13, 15}$_{[11,16,19]}$ respectively. Addition in RNS is simply the addition of the respective residues, {8+7, 0+13, 1+15}[$_{11,16,19}$], which is {4, 13, 16}$_{[11, 16, 19]}$. We can verify that the result, X+Y=301, is in fact {4, 13, 16}$_{[11,16,19]}$. For long integers, this represents a substantial parallelization due to the removal of carry propagation. Similarly, multiplication also sees benefits by yielding smaller partial products [GAR59]. Note that addition of the individual residues is cyclic, and remains within the range 0 to Mi−1 for modulus $M_i$.

Figure 5:
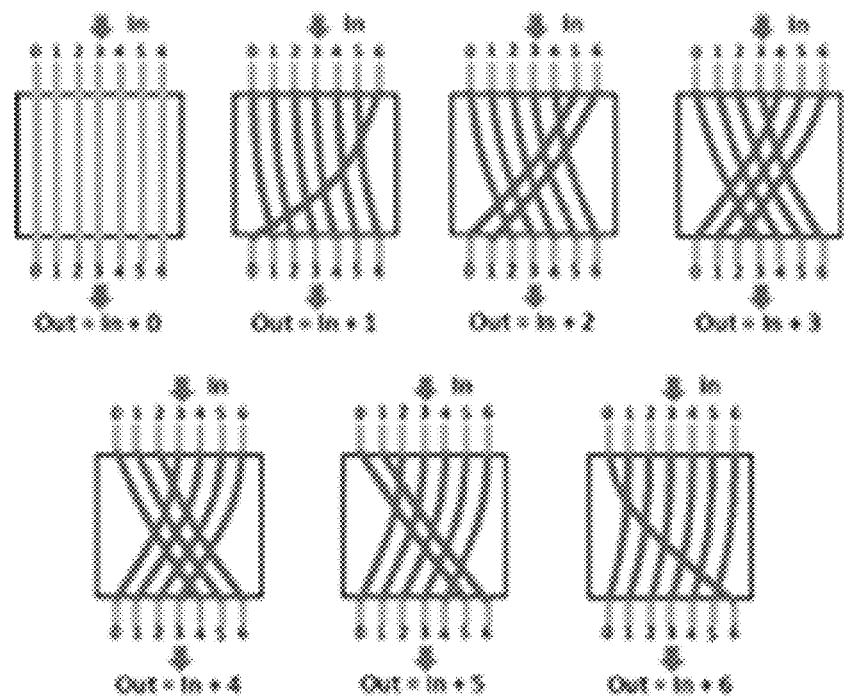
FIG. 5 shows a basic modulo adder.

FIG. 5 captures the required routing to realize a basic adder with modulus M=7. Here we use one-hot encoding to represent the residue, which means M bits are used to represent the number, out of which only one bit is set to '1' corresponding to the number it represents. FIG. 5 shows how the switch 50 can implement addition operations. For example for a modulus of 7, there are seven waveguides. Using a one-hot encoding, the number X is represented by a "1" in position x, and "0" everywhere else.

Figure 6:
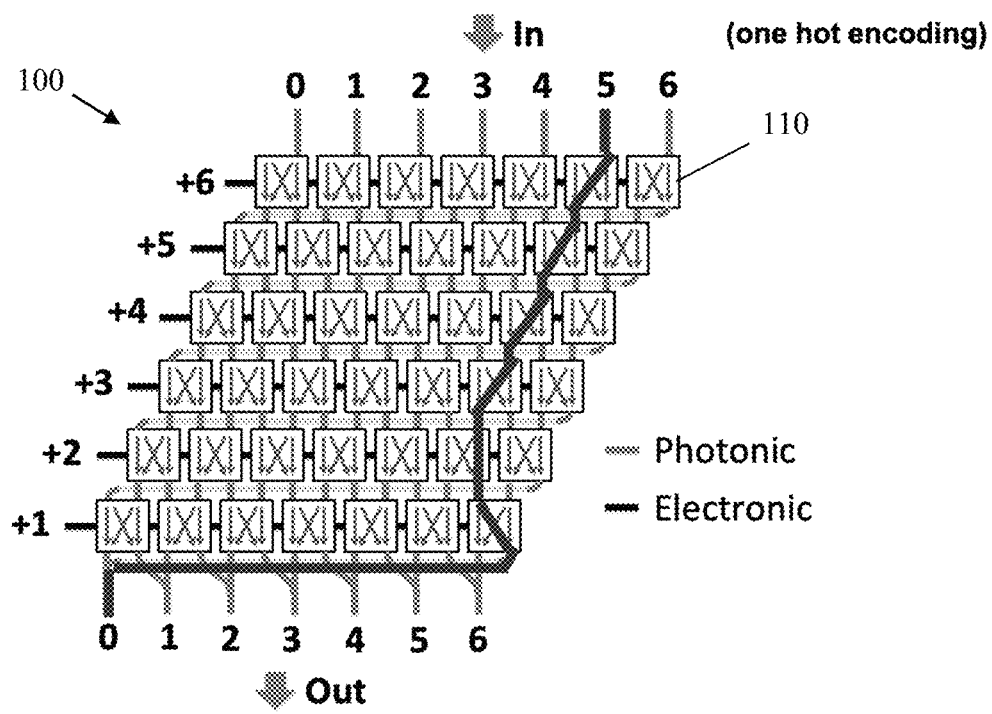
FIG. 6 shows a modulo-7 adder for the calculation of 5+2.

As shown in FIG. 6, addition with a fixed integer N is obtained by rotating the bits to the right by N bits. For example, if the input is 5, then it is represented by the one-hot bit pattern encoding <0000010>, which in FIG. 6 represents the signal at the $6^{th}$ position, which is 5 in the example shown. On adding the number 2, the result of the addition is 0 because the modulus is 7. The corresponding bit pattern is <1000000>, a rotation of the input by 2 bits. The addition operation can thus be achieved by a programmable rotate operation. As reflected in FIG. 6, the electronic components are for state control only (bar/cross), and the photonic paths are the actual data channels.

FIG. 6 shows a modulo-7 RNS Adder system or residue arithmetic nanophotonic system 100, which is also referred to here as a router 100, using phonic devices 110 such as the 2×2 switches 110. This can be realized, for example, using the design shown in FIG. 3, shown for modulus 7. The addition operation is specified electronically by the control lines, which are by default, at '0'. The modulus number can be selected depending on how large the data is, with a larger modulus being used for larger data. For example, a modulo-3, -4, -5 (M needs to be co-prime to each other) combined RNS system, can be used to represent a number below 3*4*5=60. To assign B/C states to different switches, we need to apply a bias voltage/no bias voltage to each switch individually, following the look-up table that we calculated for different M and +N. The number of switches scales with $(M-1)^2/2+2$, where M is the modulo value. Table 3 shows a comparison of different modulus architecture [PENG18].

By searching the look-up table, control signals of each switch 110 adapt to corresponding states. An example of a look-up table is shown below in Table 4 for the modulo-5 addition system 100 of FIG. 3. The look-up table provides the optimal possible states for the system 100 with the lowest power consumption, where C represents a cross (switch) and B represents a bar (not switched). The B/C values can be determined based on various factors, such as for example, that i) the path that provides the minimum switching loss (B/C states have different loss), while ii) the all-to-all connectivity still holds after the switches on a path have been set. Here, the cross state doesn't require power to be applied to the switch, which is substantially less than the bar state, which requires power to be applied to the switch. Accordingly, the B/C states in the lookup table are configured to include as many cross-states as possible. In addition, the all-to-all connectivity ensures that the B/C states in the lookup table account for all possible permutations of the inputs and outputs. Each summand has an optimal setting regarding the lowest loss. For a single summand, one setting satisfies all inputs.

TABLE 4

| | S1 | S2 | S3 | S4 | S5 | S6 | S7 | S8 | S9 | S10 |
|---|---|---|---|---|---|---|---|---|---|---|
| +0 | C | C | B | C | C | C | B | C | C | C |
| +1 | B | C | C | B | C | C | C | C | C | C |
| +2 | C | B | C | C | C | C | C | C | B | C |
| +3 | C | C | C | C | C | C | C | B | C | B |
| +4 | C | C | C | C | B | B | C | C | C | C |

Figure 4:
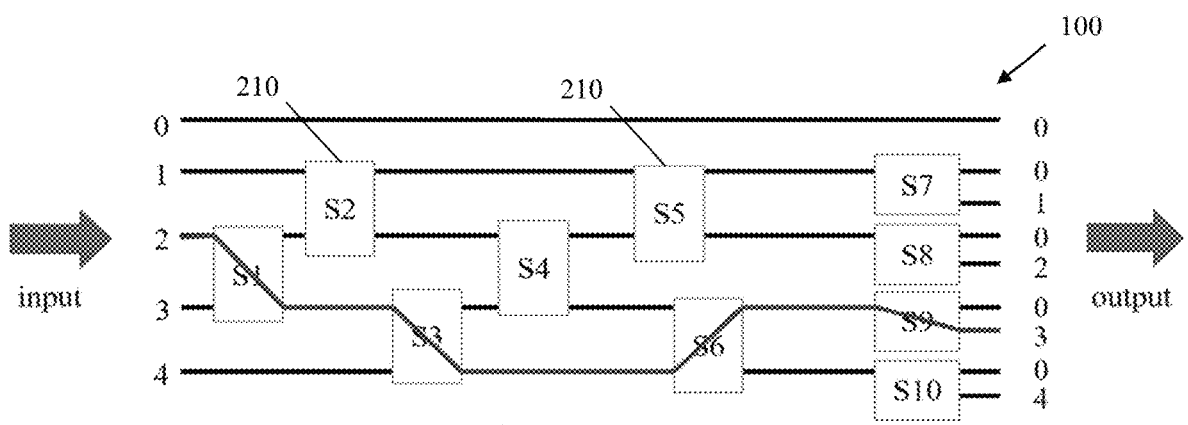
FIG. 4 is an example of the invention having a modulo-5 with 2×2 switches for multiplication.

While FIGS. 3, 4, 6 show specific modulus of 5, 7, the invention can be utilized for other modulus, greater or less. For example, to scale up the modulus, a schematic plot is shown in FIG. 2 for building an RNS adder with design strategy of the present invention for size of M. The invention can be scaled since it only cost $(M-1)^2/2+2$ switches when it scales with M. Thus, input light propagates to the expected output. The flow lines show the light path for a specific example.

Thus, FIG. 2 shows the general configuration of the switches, wherein the consecutively numbered switches are arranged in a diagonal fashion with respect to one another. That is, for a modulos-5 system, as shown in FIG. 3, switches S1, S2 are arranged diagonally upward by one line, whereby the bottom input to S2 is coupled with the top output of S1. Then the next switch S3 is arranged diagonally downward from the first switch S1 by one line, whereby the top input to S3 is connected to the lower output of S1. Then S4, S5 are arranged diagonally upward from S3. Then S6 is arranged diagonally downward from the lowest switch S3, and S7, S8, S9 are arranged diagonally upward from S6. Switch S10 is then placed on the bottom two output lines, as

TABLE 3

| | | Mesh RNS Model | | | | ASD RNS Model | |
|---|---|---|---|---|---|---|---|
| Parameters | | MRR | MZI | AOS | Scale with M | HPP | Scale with M |
| # of Optical Components | | 20 | 20 | 20 | M (M − 1) | 10 | $(M - 1)^2/2 + 2$ |
| # of Control Circuit | | 4 | 4 | 4 | M − 1 | 10 | |
| # of Look-up Table (LUT) | | — | — | — | — | 50 | $M[(M - 1)^2/2 + 2]$ |
| Energy/op. | Thermal | 14 fJ/bit | — | — | M(M − 1) | — | — |
| | Switching | | 500 fJ/bit | 12 nJ/bit | | 5 fJ/bit | $(M - 1)^2/2 + 2$ |
| | Control | | <1 fJ/bit | | M − 1 | 2 fJ/bit | |
| Area | Component | 3200 μm² | 200 μm² | 10 μm² | M(M − 1) × $A_{device}$ + | 200 μm² | $[(M - 1)^2/2 + 2] \times$ |
| | Control Circuit | | <1 μm² | | (M − 1) × $A_{control}$ | 2 μm² | $(A_{device} + A_{control}) +$ |
| | | | | | | | $[M(M - 1)^2/2 + 2] \times A_{LUT}$ |
| Response Time | | 40 ps | 14.3 ps | 0.2 ps | 1 | 5.1 ps | 1 |
| Propagation Time/Device | | 0.8 ps | 0.1 ps | <0.1 ps | M − 1 | 0.1 ps | M | in FIG. 2. That configuration allows for all possible permutations of inputs and outputs to be achieved with a suitable B/C state lookup table.

FIG. 3 is an example of a specific modulus 5 system. As an example of its operation is for the addition of 2+4, so that the input light starts at the second input 2. As provided in the look-up table shown in Table 4, the states of S1 to S10 are CCCCBBCCCC, when 4 is the other summand, where B represents a "bar" (e.g., a +0) and C represents a cross on the switch (i.e., a +1). Those states meet the look-up table criteria of all-to-all connectivity and lowest loss.

This B/C sequence enables all the light paths for adding 4 (e.g. 1→5, 2→1, 3→2, etc.). Thus, the light passes from input 2 to the second input of the first switch S1. The first switch S1 has the state "C" and outputs the signal on line 1 to the second input of the second switch S2. The second switch S2 has the state "C", and so it crosses the light to line 0. Thus, the second switch S2 outputs the light to the first input of the fifth switch S5. The fifth switch S5 has the state "B", and so the light passes straight through switch S5 uncoupled, to the first input of the ninth switch S9. The ninth switch S9 has the state "C", so the light couples to line 1 and reaches the output 1 port. Accordingly, because the final output is on line 1, the RNS results is 1 for |2+4|$_5$. This example shows that any number can be represented as a modulus 5 number, or any other suitable modulus operation. The system 100 applies a modulus of 5 in FIG. 3 by having 5 waveguides, namely five inputs 0-4 and five outputs 0-4.

Recollect that without an applied control voltage, the switches are in their 'Cross' state. To add 'N', the control line '+N' is asserted to a '1' state. This directs the switches in the corresponding row to operate in the 'Bar' state, and transmit the light directly without coupling. This circuit automatically achieves the required bit rotation. As part of this invention, circuits can be provided for different computational primitives, including subtraction, multiplication, and division [TAI79]. Division is known to be difficult with RNS, but division operations that yield only a quotient without a remainder are still possible [TAI79]. Note, scaling and fixed-point arithmetic, which will be explored as part of this work (Section 3.3). Very recently residue arithmetic using ultimate fast optical switch [BA KH15] and ring resonators [BAKH16] were explored.

Switching/Routing Functions Using Nanophotonic Switches

A non-blocking crossbar may be provided using the 2×2 switches 110. Controlling each row of the optical switches 110 causing a lot of resource waste since only 1/(M−1) switches are utilized when one computation is operating [TAI79]. Therefore, a new schematic named all-to-all sparse directional (ASD) residue number system computing module based on the drifting model of residue arithmetic [PENG18].

FIG. 3 shows an example of a residue number system 100 with five inputs and outputs in a modulo-5 RNS system having switch devices 110, which can be the same as the conventional switch devices 50. This new diagram decreases the footprint of the whole RNS arithmetic system. Instead of controlling the whole line, the proposed all-to-all sparse directional RNS module allows the single control of each optical switch, resulting in a small footprint, low-energy consumption, and high-speed residue arithmetic module. The control signal is stored in a look-up table.

FIG. 4 shows a Modulo-5 RNS multiplier system 200 implemented by controlling the switch device 210 according to the content stored in the look-up table. The system has M inputs and M outputs, since all the 0 outputs can be regarded as one port since any signal received by any 0 port will be regarded as 0 with no difference. Here, the states of switches S1 to S10 are CCCCCCCCCC when 4 is the other factor. For the operation 2×4, the system 200 starts with the input signal on line 2. The light passes to the first input of the first switch S1. Since the state of the first switch S1 is "C", the light crosses to line 3, where it is transmitted on line 3 to the first input of the third switch S3. The state of the third switch S3 is "C", so the light then passes to line 4 and is transmitted to the second input of the sixth switch S6. The state of the sixth switch S6 is "C", so the light crosses back to line 3 and is transmitted on line 3 to the first input of the ninth switch S9. The state of the ninth switch S9 is "C", so the light crosses to output 3. Thus, the final output of the system 200 is on line 3, so that the RNS results is 3 for |2×4|$_5$ [PENG18]. The switch configuration depends on the look-up table, just like the Modulo-5 look-up table shown in Table 4.

The systems 100, 200 can be provided with self-routedness to simplify the control and reduce the size of the look-up-tables. Here, the individual switches S1-S10 figure out their own setting based on the destination. As long as the outputs are different, the router is non-blocking. Directing multiple inputs to the same output would require WDM, which will also be explored as part of this proposal and evaluated for any potential benefits.

Applications

Photonic arithmetic based on the switching and computing circuits 100, 200 described above open up opportunities for on-the-fly computing while data is in transit, namely enabling an on-chip processing-in-network (PIN). In addition to the inherently low energy consumption in the proposed nanophotonic circuits, the energy is further reduced due to reduced conversions between optical and electronic signals inherent in traditional processing. These advantages are clarified in the proposed use cases that we present in this section. We first describe a generic RNS-based optical computing/switching array, followed by potential applications. We also propose two additional interesting designs with our 2×2 switches in this section.

RNS-Based Computing and Switching Array

FIGS. 3, 4 provide a photonic adder and multiplier based on residue number systems (RNS), and noted circuits for other arithmetic primitives such as subtractor, and integer divider. In addition, a unified programmable multi-function arithmetic core based on RNS can be provided. The RNS core involves: format conversion, fixed-point and floating-point arithmetic, multiple moduli, and large moduli.

Format conversion involves the efficient conversion between binary and one-hot RNS representation, which is important to integrate this unit as part of a digital computer. The invention provides efficient integration of the conversion circuits into Electric-Optic and Optic-Electric conversion circuits. Computational kernels based on RNS based arithmetic consume up to 57% lower power even with the conversions factored into the measurements [CHOK09]. This is significant considering that the implementation was carried out in software on a DSP ARM core. Custom hardware as well as attojoule nanophotonics can naturally bring in substantial improvements (See Table 2).

Fixed-point and Floating-point arithmetic: while integer arithmetic covers a wide range of applications, even wider applicability demands the use of fractional numbers through fixed-point as well as floating-point arithmetic. Number representations and circuit designs can be provided to handle fixed-point numbers [ANDR96], as well as floating-point numbers. All number representation can include number scaling and rounding issues.

Designs for multiple moduli: The invention can provide an adder for modulus=7. A unified design can be provided for several different moduli. In addition, the ASD residue computing engine design of FIGS. 3, 4 is an adder and a multiplier for modulus-5.

Large moduli: circuits can be provided with small moduli. In addition, circuits can be provided with larger moduli using one-hot encoding. Here, the term large does not have a specific value, but rather represents by integrating WDM or other mechanism, a modulo-M system could represent a system larger than M. For instance, if the modulus were 357, we would need 357 separate waveguides at the input, in addition to 357×356 switches. To limit the number of elements, the invention can utilize, for instance, wavelength division multiplexing (WDM), in order to accommodate a group of bits within a single waveguide. The 2×2 switch design can be changed accordingly to support multiple wavelengths, which can be achieved via nanoscale waveguide-inline cavities. Alternatively, the system can adopt time-division multiplexing—using the circuit for a smaller modulus but deploying buffers at the input to feed data in multiple parts.

Figure 7:
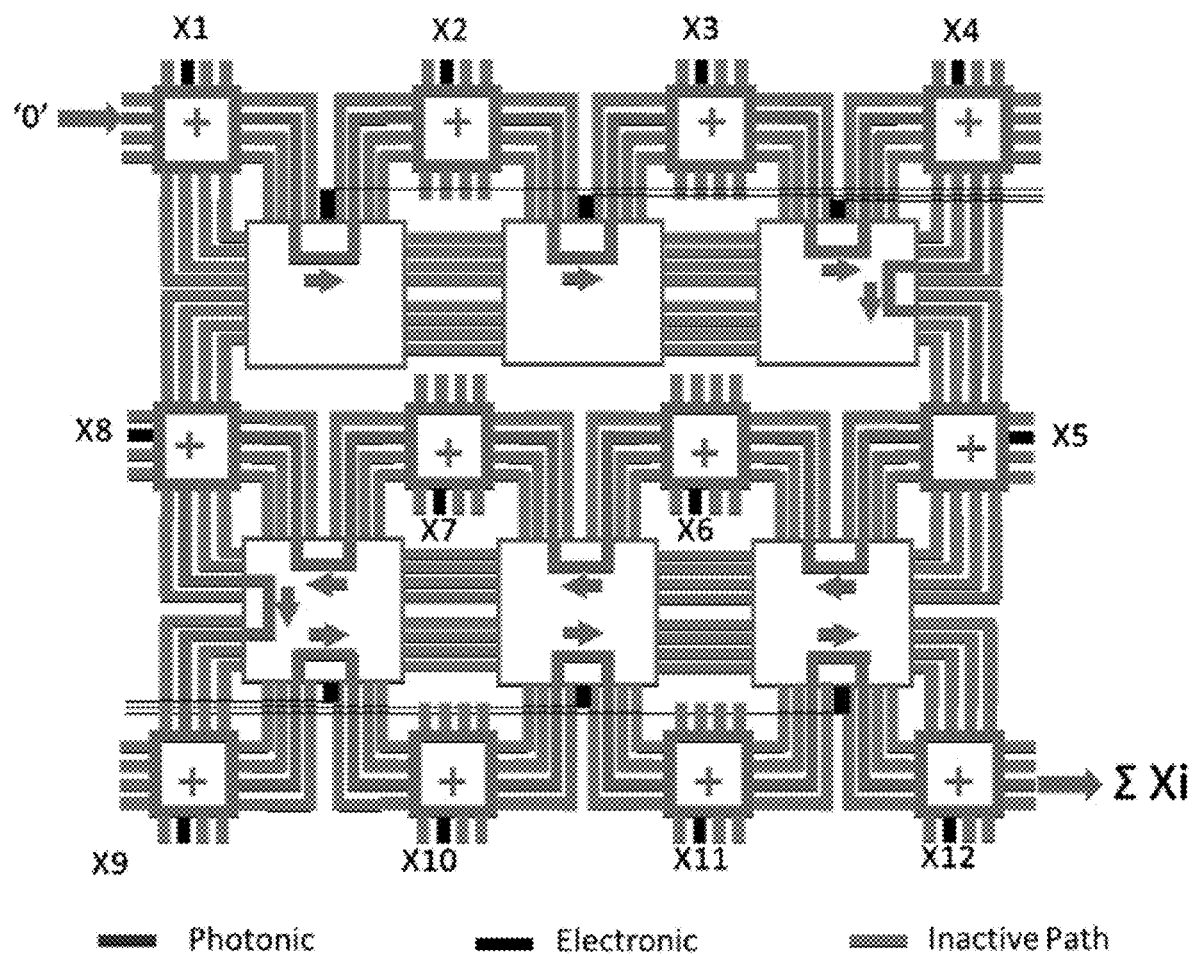
FIG. 7 shows a multi-core programmable RNS computing/switching array.

Referring to FIG. 7, a multi-core programmable RNS computing/switching array is shown, using the RNS core explained here and the switching crossbar above. Each of the cores has photonic inputs, while also incorporating electronic inputs that are required in the RNS core (see, for example, the adder in FIG. 3). The crossbars distributed throughout the array are controlled electronically, with their control lines originating from storage elements/buffers (not shown). The crossbars enable a multitude of connections to allow the RNS cores to communicate according to the requirements of the operation being executed. Furthermore, nested residue number system can be provided by separating the large moduli into a smaller residue number system [NAKA15]. The small moduli systems are practical and allow having the same hardware reutilized. Thus, optical resources could be saved, and larger moduli might be implemented in a feasible way. The small modulus residue module can be used to combine a large modulus residue system.

As shown in FIG. 7, the Collective Device has twelve (12) RNS switching systems (e.g., as shown in FIG. 2 or 3) X1-X12. Each switching system X1-X12 performs an additive computation. For example, the input can be 0, as shown, and X1 can be used to add a number to that input. The summation of those two numbers passes through a to the second system X2, where a third number is added. The summation of those three numbers then passes to the third system X3, and so on down the line until the final summation $\Sigma Xi$ of all the numbers exits from the final system X12. The electronic input to each system X1-X12 controls operation of the respective switch to perform bar or cross state switching.

Execution Model and Supporting Infrastructure

The RNS compute/switching array requires some supporting infrastructure in order to operate. Each of the cores need front-end circuits that feed the data, fetch the next set operations to be executed, and store result operands. A simulator models the entire array, including the supporting structures as necessary. For execution, macro-operations are mapped onto the array that involves a bunch of RNS cores to execute together. While the cores are not required to execute the same operation in lockstep (a la vector machines), the operations mapped onto the cores require tight communication that capitalize on the photonic switches and on-the-fly processing. Each of the cores have a private memory that serves these macro-operations as well as the data.

Figure 8:
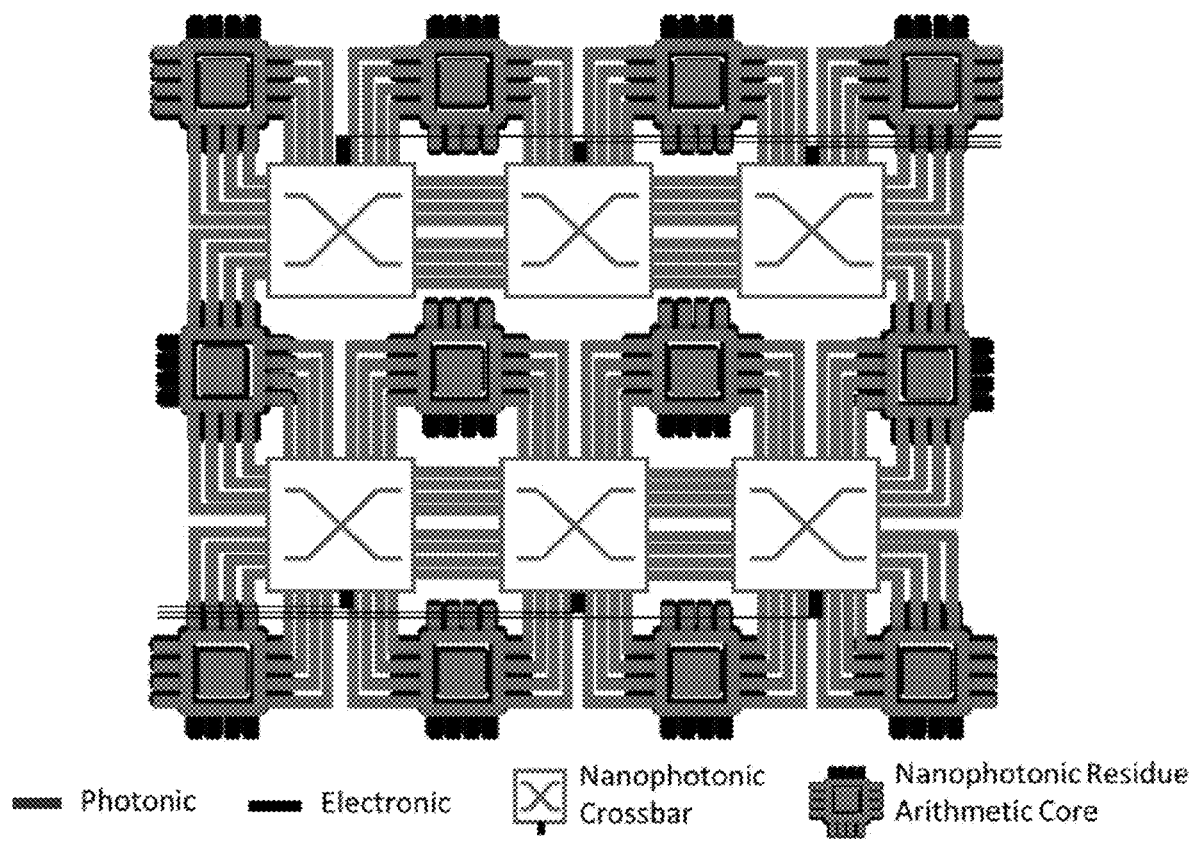
FIG. 8 shows the mapping of a reduction operation SUM onto the RNS array.

As an example application, a Collective Operations (Reduction) device is provided in FIG. 8. Here, FIG. 8 is a generic representation of the example of FIG. 7, to show that the system can be configured in any number of ways with different modulus switching devices, for a computer application. Here, the systems X1-X12 are nanophotonic residue arithmetic cores, and the summation passes to a nanophotonic crossbar that controls which system X1-X12 receives that summation value. Collective operations are an integral part of parallel computing paradigms, and involve the participation of all the nodes in the parallel program. For instance, the reduction operation in MPI can compute an associative operation (such as addition, multiplication, min, max) across all cores [HEM94]. Due to the participation of all nodes, reduction operations can be expensive and are often optimized in the software library as well as in hardware [ALM05]. FIG. 8 shows the mapping of a reduction operation SUM onto the RNS array (FIG. 7). Each core is configured as an adder, and the input operand at each core is provided through an electronic input port.

At the top left, a '0' is provided as the input in RNS format. The addition operation is performed entirely in photonics, and the total sum appears in the output of the last core in the RNS format, in the optical domain. There are no intermediate electronic-optic-electronic conversions required before/after the addition operation at each core. Each addition is carried out on the fly along with the data routing. Once the inputs are set up, the time to completion depends entirely on the speed of light alone. This example demonstrates the synergistic benefits by incorporating computing within the switching/routing operation.

FIG. 7 depicts a multicore programmable RNS computing/switch. Each of the cores has photonic inputs, while also incorporating electronic inputs that are required in our RNS core (the adder or the multiplier). The crossbars distributed throughout the array are also controlled electronically, with their control lines originating from storage elements/buffers (not shown). The crossbars will enable a multitude of connections to allow the RNS cores to communicate according to the requirements of the operation being executed.

Parallel Operations using WDM

Figure 9:
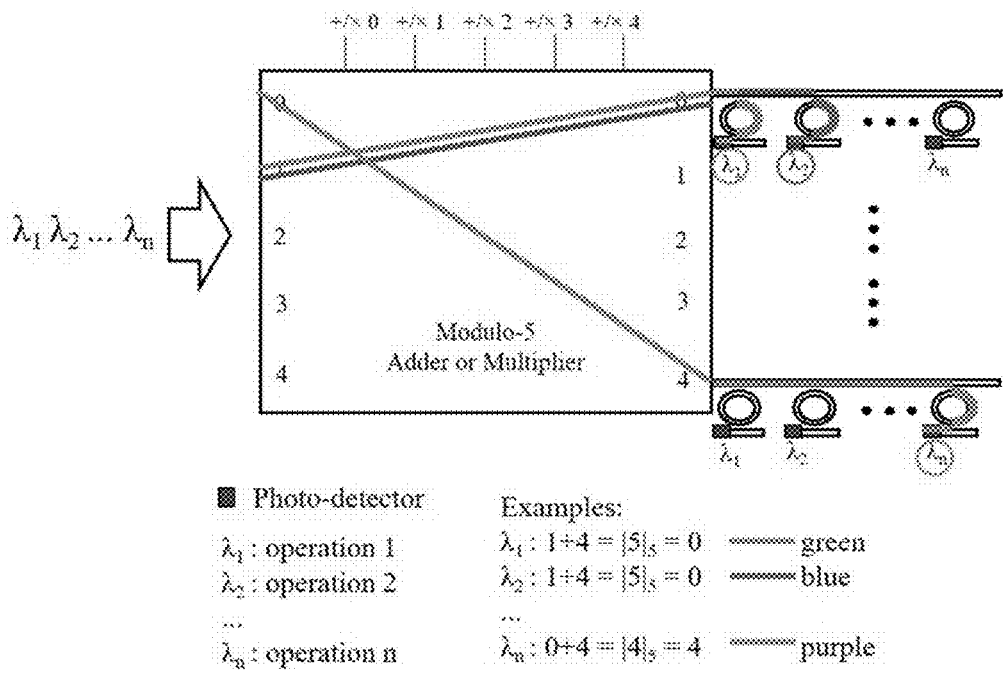
FIG. 9 is a system to implement RNS using wave division multiplexing.

Turning to FIG. 9, another example of the system of the invention uses wavelength division multiplexing (WDM) to allow multiple inputs to be processed in parallel. This requires extensions to the design of the 2×2 switches to switch different wavelengths independently in the RNS core. Multiplication-accumulation (MAC) operations are ideal to be fed into this model, especially in the convolutional neural network, which contains more than 90% MAC operations [NAKA15]. A weight matrix is applied millions of times as a multiplicand or a summand repetitively, thus a photonic RNS engine can be set once as the constant input every million times calculation and operates rapidly by taking advantage of the short optical propagation delay.

Spectral selectivity can be provided by ring-drop filters back-end, as shown in FIG. 9. Thus, for example, the system can process light having different wavelengths (e.g., different colors) in parallel using the passive rings as filters. Accordingly, one or more filters, such as rings, are provided following the switching network or array. The filters determine the wavelength of the light that was processed by the system. Photo-detectors can identify corresponding results. Accordingly, a set of filters is provided for each output 0-4. Each filter can detect the wavelength of the light that is transmitted at that respective output. In the example shown for FIG. 9, a green wavelength light and a blue wavelength light are both received at the input 1 and pass through to residual output line 1. The first filter in the set of n filters can detect the green light at a first wavelength $\lambda_1$, and the second filter in the set of n filters can detect the blue light at a second wavelength $\lambda 2$. As further shown, a red wavelength light signal is transmitted from input line 0 to output line 4, where the $n^{th}$ filter detects the light on an $n^{th}$ frequency.

This module allows multiple operations simultaneously by allocating one modulus to one wavelength, thus increasing the system efficiency. For example, if one of the summand is 4, the other summands are (1) same input with different wavelength—$\lambda_1$ and $\lambda_2$. The MRR with photodetector recognizes the result of both operation 1 (green) and operation 2 (blue) are 0. (2) different input summand—$\lambda_n$. Operation 3 "0+4" (purple) finally obtains result of 4. Multiple operations can be executed at the same time given by the number of available wavelengths. [PENG18].

The efficiency of the RNS-based approach involves a simplified calculation of the energy, delay, and area. The operation is a 16-bit reduction with K numbers. Reductions are commutative operations defined over n number to integrate then via performing operation such as sum, multiply, logic_and, logical_or, min, max, and the like. Here we consider an addition. Note that a 16-bit number has a range 0-65535, so we choose moduli to cover this range in the RNS format. In other words, a 16-bit binary number is represented as a ~40-bit residue number using our one-hot encoding, for all the three moduli.

We compare the RNS array against an electronic network-on-chip (NoC) implementation. The architectures compared are similar to FIG. 7, with an array of adders, along with an array of routers. The cores are spaced 2 mm apart, which is normal for a NoC [KURI10]. Area estimates for the 16-bit binary adders are from the literature [MOHA14], scaled down to 22 nm, whereas the corresponding RNS adder estimates are based on our 2×2 switch parameters (Table 1). Energy is in pJ per number operated on. The estimates for the other components—Binary Crossbar, NoC Router, and Electronic Link are obtained using DSENT [SUN12]. The NoC Router is decomposed into crossbar+additional infrastructure such as buffers and routing logic, shown on two rows. Numbers for the nanophotonic links are from our paper [SUN18]. The estimates are in Table 2. The total area, energy, and latency for a reduction of K-numbers is directly K times the sum of values provided in the first and last row. We define the figure of merit (FOM) as the ratio of (1/latency) and product of energy and area; units are GHz/fJ-cm2. The FOM values for the adder and router+crossbar are shown separately.

As we can see from the above estimates, energy reduces by a factor of 24× using the RNS array. Latency improvement factor is 110×, because the RNS latency is very small and is predominantly the light propagation delay across the cores that are 2 mm apart each. On the other hand, the latency for the electronic NoC case is composed of 4-clock cycles overhead for each pass through the router and 1 clock cycle on each 2 mm electronic link traversed. However, the area of RNS is significantly larger due to multiple circuits and crossbars for the three moduli (as well as a large value of the modulus yielding a large number of 2×2 switches), which underscores the need for optimizations using WDM or TDM. The overall FOM shows a factor of 4× improvement for addition and 20000× improvement for routing.

Nanophotonic Barriers for Extreme Scale Computing

Synchronization operations in large-scale systems can consume a lot of power and incur performance penalties due to the need for all cores to communicate with each other [LI04, ANBA11]. One common synchronization operation is the barrier, which requires all the participating cores to stop execution and wait until all cores have arrived at the barrier, before advancing any further in executing the rest of the program. Nanophotonics provides a viable means for integrating barriers within the communication network, at very high performance. Our proposed 2×2 switches are particularly useful with respect to barrier implementation. The invention adopts the following approach for a 'lean' barrier implementation [BINK09].

Figure 10:
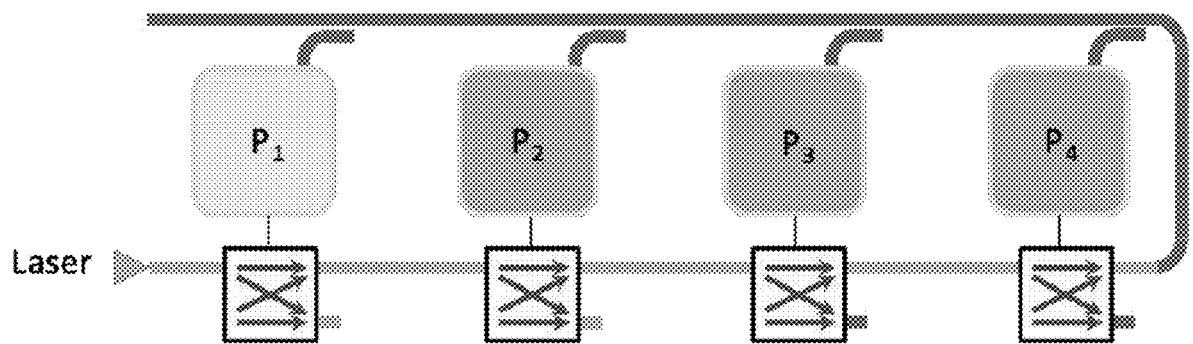
FIG. 10 shows a processing device for use with the switching system of the present invention.

FIGS. 10-14 are examples showing applications for the RNS system in accordance with the current invention. For example, FIG. 10 shows the RNS system for use with any general-purpose manycore system. Each core controls a 2×2 switch that diverts light from its input waveguide by default (control voltage='0'). However, once the processor arrives at the barrier, it asserts the control voltage for the respective switch, which allows light to pass through. The waveguide wraps around at the top as shown, and through appropriate coupling each processor senses the presence of light on the waveguide. When a processor sees right at the receiving end, it can safely infer that all processors have arrived at the barrier.

Figure 11:
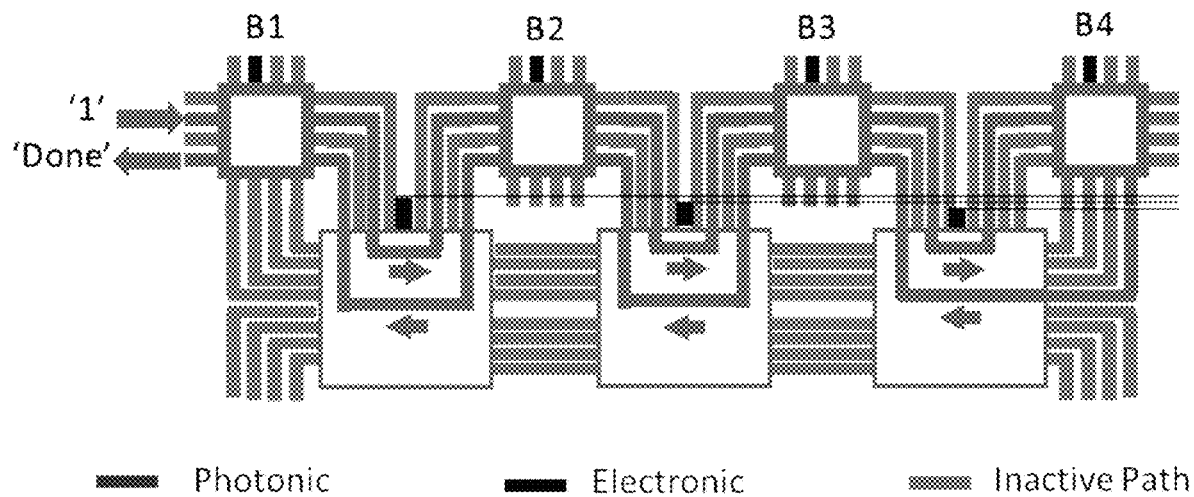
FIG. 11 shows a barrier operation.

The barrier operation can also be utilized with the RNS compute/switching array, as shown in FIG. 11. The signal Bi indicates the barrier operation at core i. The crossbars are configured to create the waveguide loop in accordance with FIG. 10. To sense the barrier operation based on the presence of light on its reverse path (towards the 'Done' output), appropriate waveguide couplers/splitters will need to be incorporated within each core so that the light is sensed non-destructively on its return path.

Extensions for Final Impulse Response (FIR) Filtering

Residue number systems have been popular for digital signal processing (DSP) systems [CHOK09], and RNS implementations for digital filters have also been reported [ANDR01]. Finite impulse response (FIR) filters potentially lend themselves well for our proposed optical residue number processing. The constant coefficients can serve as one of the fixed inputs that drive the switches in the RNS cores. Data input samples can be clocked into the optical port, and it would remain in the optical domain until the output.

Figure 12:
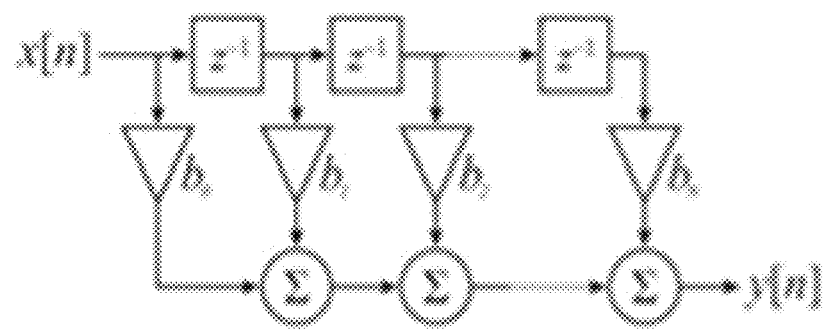
FIG. 12 shows a discrete-time FIR filter of order N.
Figure 13:
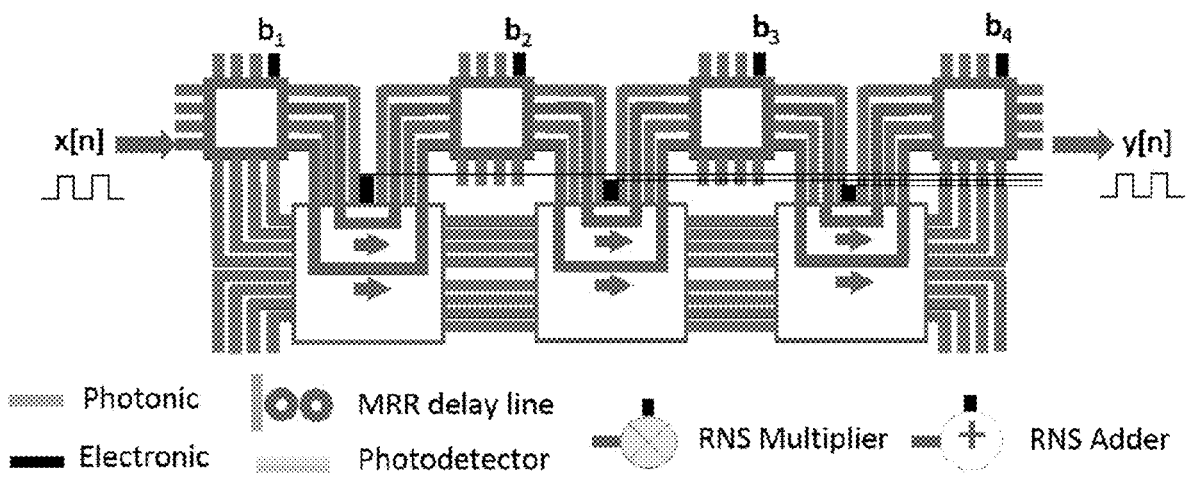
FIG. 13 shows the FIR filter for use with the present invention.
Figure 14:
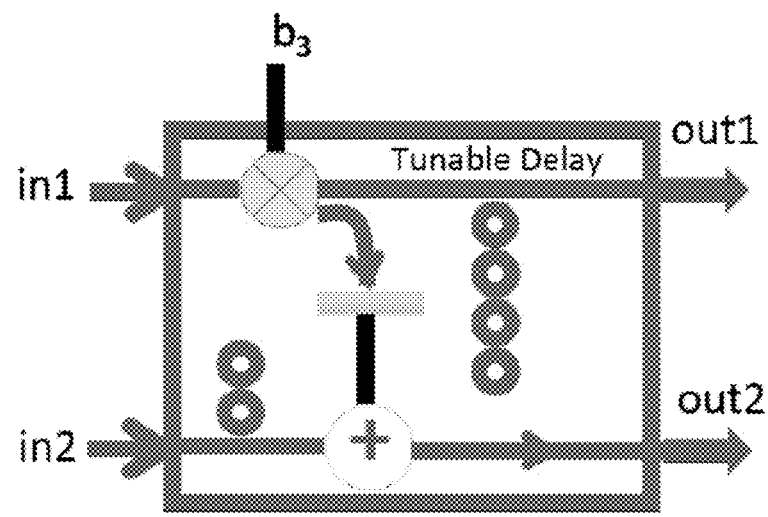
FIG. 14 shows a tunable delay line made up of ring filters.

However, the RNS cores may need some additional components, explained as follows. FIG. 12 shows the schematic of an FIR filter; x[n] is the input that is streamed into the filter, the b; values are the filter coefficients, and y[n] is the streaming output. In the figure, $z^{-1}$ represents a unit delay corresponding to one sample period, or one clock cycle. The mapping of the FIR filter structure onto our RNS compute/switching array is straightforward, as depicted in FIG. 13. Each RNS core is programmed to carry out a multiply as well as an add operation. However, the one-clock cycle delay will need an additional component such as a tunable delay line made up of ring filters [MORI08], FIG. 14.

Furthermore, even though the filter coefficients bi are constant and are readily multiplied with input data using an RNS multiplier, the addition operation can be carried out on two data items which are both in the optical domain. Since our RNS adder cannot handle this case, one of the inputs has to be converted into the electronic domain as shown, using a photodetector. This doesn't need any storage element that is typical in a conventional receiver, but instead the photodetector output would feed the adder directly, thus saving some energy. However, to compensate for the photodetector delay a small delay is introduced on the other input of the adder, as shown. This is just an example to make the cores widely applicable for applications. In this example, there are energy savings as the opto-electric conversion is carried out on only one of the data lines.

The Residue number systems of the invention can be utilized for neural networks and deep learning applications based on convolutional neural networks, for example. In addition, the photonic devices need not be switches, but can be other suitable components such as, for example, spatial light modulators (SLM) and/or digital mirror displays (DMD). DMDs can be light amplitude controlling. In general, any light amplitude and phase controlling device can be used. In this sense RNS is essentially a form data encoding/modulation. The read-out is always 'one-hot' meaning where light comes out (in the amplitude scheme of the N×M router is the answer to the RNS addition or multiplication.

It is further noted that the invention is shown and described utilizing 2×2 switches. The 2×2 switch can be utilized for any components with two inputs and two outputs and the switching mechanism (i.e. add-drop rings, MZIs, etc.). But to have the WDM capability, this component needs to be broadband as well. However, other suitable devices can be utilized.

The following references are hereby incorporated by reference.

(1) [ALM05] Almási, George, Philip Heidelberger, Charles J. Archer, Xavier Martorell, C. Chris Erway, José E. Moreira, B. Steinmacher-Burow, and Yili Zheng. "Optimization of MPI collective communication on Blue-Gene/L systems." In Proceedings of the 19th annual international conference on Supercomputing, pp. 253-262. ACM, 2005.
(2) [ANBA11] Anbar, Ahmad, Olivier Serres, and Tarek El-Ghazawi. "Reflex Barrier: A Scalable Network-Based Synchronization Barrier." In Parallel and Distributed Systems (ICPADS), 2011 IEEE 17th International Conference on, pp. 204-211. IEEE, 2011.
(3) [ANDR01] Del Re, Andrea, Alberto Nannarelli, and Marco Re. "Implementation of digital filters in carry-save residue number system." Signals, Systems and Computers, 2001. Conference Record of the Thirty-Fifth Asilomar Conference on. Vol. 2. IEEE, 2001. (4) [ANDR96] Andraos, S., 1996, August. Fixed point unsigned fractional representation in residue number system. In Circuits and Systems, 1996., IEEE 39th Midwest symposium on (Vol. 1, pp. 555-558). IEEE. [BAKH15] Bakhtiar, L. A., Yaghoubi, E., Hamidi, S. M. and Hosseinzadeh, M., 2015. Optical RNS adder and multiplier. International Journal of Computer Applications in Technology, 52(1), pp. 71-76.
(5) [BAKH16] Bakhtiar, L. A. and Hosseinzadeh, M., All optical residue arithmetic with micro ring resonators and its application. Optical and Quantum Electronics, 48(2), pp. 1-13, 2016. [BINK09] Binkert, N., Davis, A., Lipasti, M., Schreiber, R. and Vantrease, D., 2009, December. Nanophotonic barriers. In Workshop on Photonic Interconnects & Computer Architecture (in conjunction with MICRO 41) (pp. 1-4).
(6) [CHOK09] Chokshi, Rooju, et al. "Exploiting residue number system for power-efficient digital signal processing in embedded processors." Proceedings of the 2009 international conference on Compilers, architecture, and synthesis for embedded systems. ACM, 2009.
(7) [GAR59] Garner, Harvey L. "The residue number system." Electronic Computers, IRE Transactions on, vol 2., pp. 140-147, 1959.
(8) [HEM94] Hempel, Rolf "The MPI standard for message passing." High-Performance Computing and Networking. Springer Berlin Heidelberg, 1994.
(9) [KURI10] Kurian, George, Jason E. Miller, James Psota, Jonathan Eastep, Jifeng Liu, Jurgen Michel, Lionel C. Kimerling, and Anant Agarwal. "ATAC: a 1000-core cache-coherent processor with on-chip optical network." In Proceedings of the 19th international conference on Parallel architectures and compilation techniques, pp. 477-488. ACM, 2010.
(10) [LI04] Li, Jian, Jose F. Martinez, and Michael C. Huang. "The thrifty barrier: Energy-aware synchronization in shared-memory multiprocessors." In Software, IEE Proceedings-, pp. 14-23. IEEE, 2004.
(11) [LIU16] K. Liu, A. Majumdar, V. J. Sorger, "Fundamental Scaling Laws for Nanophotonics", Nature Communications, (submitted).
(12) [MOHA14] Mohanty, Basant Kumar, and Shital K. Patel. "Area-Delay-Power Efficient Carry-Select Adder." Circuits and Systems II: Express Briefs, IEEE Transactions on 61, no. 6, pp. 418-422, 2014.
(13) [MORI08] Morichetti F, Melloni A, Ferrari C, Martinelli M. Error-free continuously-tunable delay at 10 Gbit/s in a reconfigurable on-chip delay-line. Optics express. 2008 Jun. 9; 16(12):8395-405.
(14) [NAKA15] Nakahara, H. and Sasao, T., 2015, September. A deep convolutional neural network based on nested residue number system. In Field Programmable Logic and Applications (FPL), 2015 25th International Conference on (pp. 1-6). IEEE.
(15) [PENG18] Peng, J., Sun, S., Narayana, V. K., Sorger, V. J. and El-Ghazawi, T., 2018. Residue number system arithmetic based on integrated nanophotonics. Optics letters, 43(9), pp. 2026-2029.
(16) [SUN12] Sun, Chen, C-HO Chen, George Kurian, Lan Wei, Jason Miller, Anant Agarwal, Li-Shiuan Peh, and Vladimir Stojanovic. "DSENT-a tool connecting emerging photonics with electronics for opto-electronic networks-on-chip modeling." In Networks on Chip (NoCS), 2012 Sixth IEEE/ACM International Symposium on, pp. 201-210. IEEE, 2012.
(17)
[SUN18] Sun, S., Narayana, V. K., Sarpkaya, I., Crandall, J., Soref, R. A., Dalir, H., El-Ghazawi, T. and Sorger, V. J., 2018. Hybrid photonic-plasmonic nonblocking broadband 5×5 router for optical networks. IEEE Photonics Journal, 10(2), pp. 1-12.
(18) [TAI79] Tai, A., I. Cindrich, James R. Fienup, and C. C. Aleksoff "Optical residue arithmetic computer with programmable computation modules." Applied optics 18, no. 16, pp 2812-2823, 1979.

The invention, including for example, the systems 100, 200, can include a processing device to perform various functions and operations in accordance with the invention, such as for example providing a control signal to the switches 110, 210 or access to a lookup table. The processing device can be, for instance, a computer, personal computer (PC), server or mainframe computer, or more generally a computing device, processor, application specific integrated circuits (ASIC), or controller. Or the processing device can be simply be a storage device that stores a lookup table, such as memory, RAM, ROM, DVD, CD-ROM, analog or digital memory, flash drive, database, computer-readable media, floppy drives/disks, and/or hard drive/disks.

The storage device(s) can have stored thereon machine executable instructions for performing the processes of the invention. The processing device can execute software that can be stored on the storage device. Unless indicated otherwise, the process is preferably implemented in automatically by the processor substantially in real time without delay. Information can be accessed on a "medium", which refers to one or more non-transitory physical media that together store the contents described as being stored thereon.

Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A residue photonic system, comprising:
   an array of a plurality of 2×2 photonic switches, said array having M modulus inputs and M modulus outputs and receiving a light signal at one input of the M modulus inputs, said plurality of photonic switches each having a bar state and a cross state and arranged to indicate a residual value of the received light signal as an output at one output of the M modulus outputs, whereby the one of the M modulus inputs reflects a first value and the bar state and cross state reflect a second value, and the one output reflects an arithmetic operation of the first value and the second value, wherein the light signal comprises a plurality of light signals, wherein each of the plurality of light signals is at a different set of wavelengths and the light signals are processed in parallel using wavelength division multiplexing; and
   a set of one or more filters at each of the plurality of outputs, said set of filters determining a wavelength of the light signal at that output.

2. The residue photonic system of claim 1, wherein the arithmetic operation comprises an addition of the first value and the second value.

3. The residue photonic system of claim 1, wherein the one output reflects a residue value of an M modulus.

4. The residue photonic system of claim 1, wherein the arithmetic operation comprises multiplication.

5. The residue photonic system of claim 1, wherein the light signal has a single wavelength.

6. The residue photonic system of claim 1, wherein the plurality of photonic switches are comprised of a material whose refractive index is actively modulated.

7. A residue photonic system, comprising:
   an array of a plurality of photonic devices, said array having M modulus inputs and M modulus outputs and receiving a light signal at one input of the M modulus inputs, said plurality of photonic devices arranged to indicate a residual value of the received light signal as an output at one output of the M modulus outputs, whereby the one of the M modulus inputs reflects a first value and a state of one of the plurality of the photonic devices reflects a second value, and the one output reflects an arithmetic operation of the first value and the second value, wherein the light signal comprises a plurality of light signals, wherein each of the plurality of light signals is at a different set of wavelengths and the light signals are processed in parallel using wavelength division multiplexing; and
   a set of one or more filters at each of the plurality of outputs, said set of filters determining a wavelength of the light signal at that output.

8. The residue photonic system of claim 7, wherein the arithmetic operation comprises an addition of the first value and the second value.

9. The residue photonic system of claim 7, wherein the one output reflects a residue value of an M modulus.

10. The residue photonic system of claim 7, wherein the arithmetic operation comprises multiplication.

11. The residue photonic system of claim 7, wherein the light signal has a single wavelength.

12. The residue photonic system of claim 7, wherein said photonic devices comprise spatial light modulators (SLM) and/or digital mirror displays (DMD).

13. The residue photonic system of claim 7, wherein the plurality of photonic switches are comprised of a material whose refractive index is actively modulated.

* * * * *